United States Patent
Diaz-López

(10) Patent No.: US 7,042,365 B1
(45) Date of Patent: May 9, 2006

(54) SEISMIC DETECTION SYSTEM AND A METHOD OF OPERATING THE SAME

(76) Inventor: William Diaz-López, P. O. Box 1081, Trujillo Alto, PR (US) 00978

( * ) Notice: Subject to any disclaimer, the term of this patent is extended or adjusted under 35 U.S.C. 154(b) by 0 days.

(21) Appl. No.: 11/015,134

(22) Filed: Dec. 17, 2004

Related U.S. Application Data

(63) Continuation-in-part of application No. 10/439,160, filed on May 15, 2003, now Pat. No. 6,909,375.

(60) Provisional application No. 60/381,372, filed on May 20, 2002.

(51) Int. Cl.
*G08B 21/00* (2006.01)

(52) U.S. Cl. .................. 340/690; 340/689; 340/521

(58) Field of Classification Search ............... 340/689, 340/690, 686.1, 539.22, 539.26, 566, 521, 340/522; 367/197–199, 13; 73/35.14
See application file for complete search history.

(56) References Cited

U.S. PATENT DOCUMENTS

| | | |
|---|---|---|
| 4,180,287 A | 12/1979 | Youngblood et al. |
| 4,354,699 A | 10/1982 | Logan |
| 4,480,480 A | 11/1984 | Scott et al. |
| 4,528,559 A | 7/1985 | Freeman |
| 4,539,555 A | 9/1985 | Tefka |
| 4,652,862 A | 3/1987 | Verslycken |
| 4,703,962 A | 11/1987 | Kelly et al. |
| 4,803,482 A | 2/1989 | Verslycken |
| 4,945,347 A | 7/1990 | Perry |
| 4,995,651 A | 2/1991 | Wardlaw |
| 5,149,157 A | 9/1992 | Laugery et al. |
| 5,307,054 A | 4/1994 | Concannon, Sr. et al. |
| 5,412,616 A | 5/1995 | González |
| 5,420,380 A * | 5/1995 | Harben et al. ............ 181/122 |
| 5,429,399 A | 7/1995 | Geringer et al. |
| 5,436,416 A | 7/1995 | Fletcher |
| 5,479,151 A | 12/1995 | Lavelle et al. |
| 5,563,575 A | 10/1996 | Yamamura |
| 5,625,348 A * | 4/1997 | Farnsworth et al. ........ 340/690 |
| 5,724,893 A * | 3/1998 | Lee et al. .................. 108/20 |
| 5,742,235 A | 4/1998 | Miché |
| 5,839,766 A | 11/1998 | Iannuzzi et al. |
| 5,992,094 A | 11/1999 | Diaz |

(Continued)

OTHER PUBLICATIONS

U.S. Appl. No. 10/078,607, filed Feb. 19, 2002, Diaz-López.

(Continued)

*Primary Examiner*—Anh V. La
(74) *Attorney, Agent, or Firm*—Hoglund & Pamias, PSC; Heath W. Hoglund

(57) ABSTRACT

A seismic switch is a programmable device capable of distinguishing between seismic movements due to an earthquake or an explosion, which is used to send a signal to control panels for security doors. The device uses accelerometers and a microcontroller for the detection and signal analysis of the seismic movements. In the event of an explosion or earthquake, the device produces a loud sound which serves as an audible alarm. Other proposed applications, with minor modifications to the device or software code, include monitoring of freight handling, emergency shut-off controller for industrial control systems and machinery, a by-pass system for electronic access control panels, and as a theft-deterrent or a component of a security system for automated teller machines and other valuable devices or items.

14 Claims, 9 Drawing Sheets

U.S. PATENT DOCUMENTS

| | | | |
|---|---|---|---|
| 6,049,287 | A | 4/2000 | Yulkowski |
| 6,265,979 | B1 | 7/2001 | Chen et al. |
| 6,292,108 | B1 | 9/2001 | Straser et al. |
| 6,298,603 | B1 | 10/2001 | Diaz |
| 6,308,644 | B1 | 10/2001 | Diaz |
| 6,311,714 | B1 | 11/2001 | Watanabe |
| 6,356,204 | B1 | 3/2002 | Guindi et al. |
| 6,392,538 | B1 * | 5/2002 | Shere .................... 340/539.26 |
| 6,414,601 | B1 | 7/2002 | Massedonio |
| 6,476,858 | B1 | 11/2002 | Diaz |
| 6,518,878 | B1 * | 2/2003 | Skoff ......................... 340/506 |
| 6,661,346 | B1 * | 12/2003 | Wood et al. ................ 340/601 |
| 2003/0014919 | A1 | 1/2003 | Diaz-Lopez |

OTHER PUBLICATIONS

American Society of Civil Engineers—Earthquake-Actuated Automatic Gas Shutoff Devices—booklet—1999—American Society of Civil Engineers—USA.

APS Dynamics, Inc.- Systems for Generating Controlled Vibration—Internet—2004—USA.

Securitron Magnalock Corp.—Securitron Power Supplies—Booklet—2003—USA.

ADT Security Systems—Unimode 5 Fire Control Communicator—Product Information, Installation, Programming and Operation Manual—1995—USA.

* cited by examiner

FRONT

BACK

SEISMIC DETECTION SYSTEM AND A METHOD OF OPERATING THE SAME

This application is a continuation-in-part of U.S. patent application Ser. No. 10/439,160 filed on May 15, 2003, now U.S. Pat. No. 6,909,375 which claims benefit of 60/381,372 filed on May 20, 2002.

FIELD OF THE INVENTION

The invention relates generally to seismic detection systems and methods of operating such systems, and more specifically to a system and method which permits periodic testing of the alarm function.

BACKGROUND OF THE INVENTION

Modern security systems have become increasingly sophisticated. Today, they are able to monitor for break-ins, smoke, fire, chemical releases and a host of other conditions requiring appropriate response. Often, these security systems interface not only with alarms to alert people of the emergency condition but also with remote monitoring facilities and emergency response teams such as the police or fire departments. In addition, these security systems can control the activation of sprinklers, the release of doors and other control functions.

Upon the detection of smoke, fire or other emergency conditions, it is especially critical to release doors, especially in crowded commercial establishments. The failure to release a single door can cause crowd panic and has in some instances resulted in the loss of life. For this reason, many methods have been applied to releasing doors under emergency conditions.

Some representative examples include: (1) U.S. Pat. No. 6,265,979, titled "Earthquake Sensing Device," to Chen and others; (2) U.S. Pat. No. 6,049,287, titled Door with Integrated Smoke Detector and Hold Open," to Yulkowski; (3) U.S. Pat. No. 5,429,399, titled "Electronic Delayed Egress Locking System," to Geringer and others; and (4) U.S. Pat. No. 4,803,482, titled "Exit Control and Surveillance System," to Verslycken. Each is incorporated herein in their entirety and each is described briefly in turn.

U.S. Pat. No. 6,265,979 generally teaches a device for detecting an earthquake and for controlling emergency functions. The device measures both horizontal and vertical vibrations. Based upon those measurements, the device determines whether an earthquake has occurred and if so releases doors.

U.S. Pat. No. 6,049,287 generally teaches a door control device that automatically releases a door upon detection of smoke. The door control device is physically mounted on the door and releases associated electronic locks.

U.S. Pat. No. 5,429,399 generally teaches a door control device that receives various alarm signals including smoke or seismic activity. In response to these alarm signals, the door control automatically releases associated door locks.

Finally, U.S. Pat. No. 4,803,482 generally teaches a door release and surveillance system. The door release is requested by a person by pressing a release lever at the door. This sends a signal to a central control location. The central location can monitor the door through a surveillance system. In response to the request it can elect to permit the door to release. Alternatively, it can delay or prevent the door to release should the central control location determine that there is not an emergency condition and the door should remain locked.

What each of these systems may serve their intended purpose, an important practical consideration is testing. Just like a fire alarm system, a seismic detection system should be periodically tested to ensure that it remains in proper operational condition. Accordingly, a system is desired which permits convenient, periodic testing.

SUMMARY OF THE INVENTION

It is an object of the invention to provide a system capable of detecting seismic activity and it is a further object of the invention that such system permit convenient, periodic testing.

According to one aspect of the invention, a method of operating a seismic sensor includes a number of steps that permit such testing. The method includes providing a seismic sensor. The seismic sensor includes a set of accelerometers, a controller, a switch and a sensor enclosure. The accelerometers generate electronic signals in response to vibrations caused by an earthquake. The controller is operationally coupled with the set of accelerometers and configured to receive the electronic signals and to determine whether the electronic signals represent an earthquake. The switch has a first and a second state and is operationally coupled with the controller. The controller changes the state of the switch upon detection of an earthquake. The sensor enclosure houses the set of accelerometers, the controller and the switch. The method further includes connecting the seismic sensor to a control system. The control system includes a controller and a control enclosure. The controller is operationally coupled with the switch. The control enclosure is larger than the seismic enclosure and houses the controller. The method further includes fixedly mounting the seismic sensor adjacent to or inside of the control system. The method further includes periodically dismounting the seismic sensor and placing the seismic sensor on a vibration table. The vibration table is operated to simulate the condition of an earthquake so that the seismic sensor operates to change the state of the switch. The seismic sensor is re-mounted when the seismic sensor operates to change the state of the switch in response to the simulated condition of the earthquake.

According to further aspects of the invention, the set of accelerometers further generate electronic signals in response to movement caused by an explosion. Three accelerometers are provided and are positioned along orthogonal axis. These accelerometers detect vibrations along their respective axis. The controller includes analog-to-digital converters that convert the signals provided by the accelerometers. The switch is a relay or an electronic switch.

According to further aspects of the invention, the seismic sensor further includes an earthquake indicator, an explosion indicator and a reset switch. The earthquake indicator is operationally coupled with the controller and configured to indicate detection of an earthquake. The explosion indicator is operationally coupled with the controller and configured to indicate detection of an explosion. The reset switch is used to reset either of the earthquake or explosion alarm conditions.

According to further aspects of the invention, the seismic enclosure is less than approximately five inches in height, width and depth, and more preferably is approximately four and a half inches in height, three and a half inches in width and two and a half inches in depth. The seismic enclosure is explosion-proof and water-tight housing having a front face, wherein the set of accelerometers, the set of amplifiers, the controller, and the switch are mounted within the explosion-proof and water-tight housing.

DETAILED DESCRIPTION OF THE INVENTION

In one preferred embodiment, a seismic detection and control circuit is connected with an external security or fire system capable of activating alarms, releasing doors, initiating emergency calls and other control functions. In the event of seismic activity, the detection circuit determines whether an explosion or earthquake has occurred. If so, the control circuit activates the external security systems. In the event of an explosion, the alarm condition is forwarded to emergency responders such as the fire department. In the event of an earthquake, the alarm condition is not forwarded to emergency responders to avoid over-loading their communication systems (and the emergency responders in the area would not need notice because they would also be experiencing the earthquake conditions). Preferably, the seismic detection and control circuit is enclosed within an explosion proof box. On the front face, status lights indicate whether the device is active and whether an alarm condition has been detected, and control switches for testing and resetting the detection and control circuit are accessible to a user. Preferred embodiments and methods of operation are described further below with reference to the figures.

Figure 1:
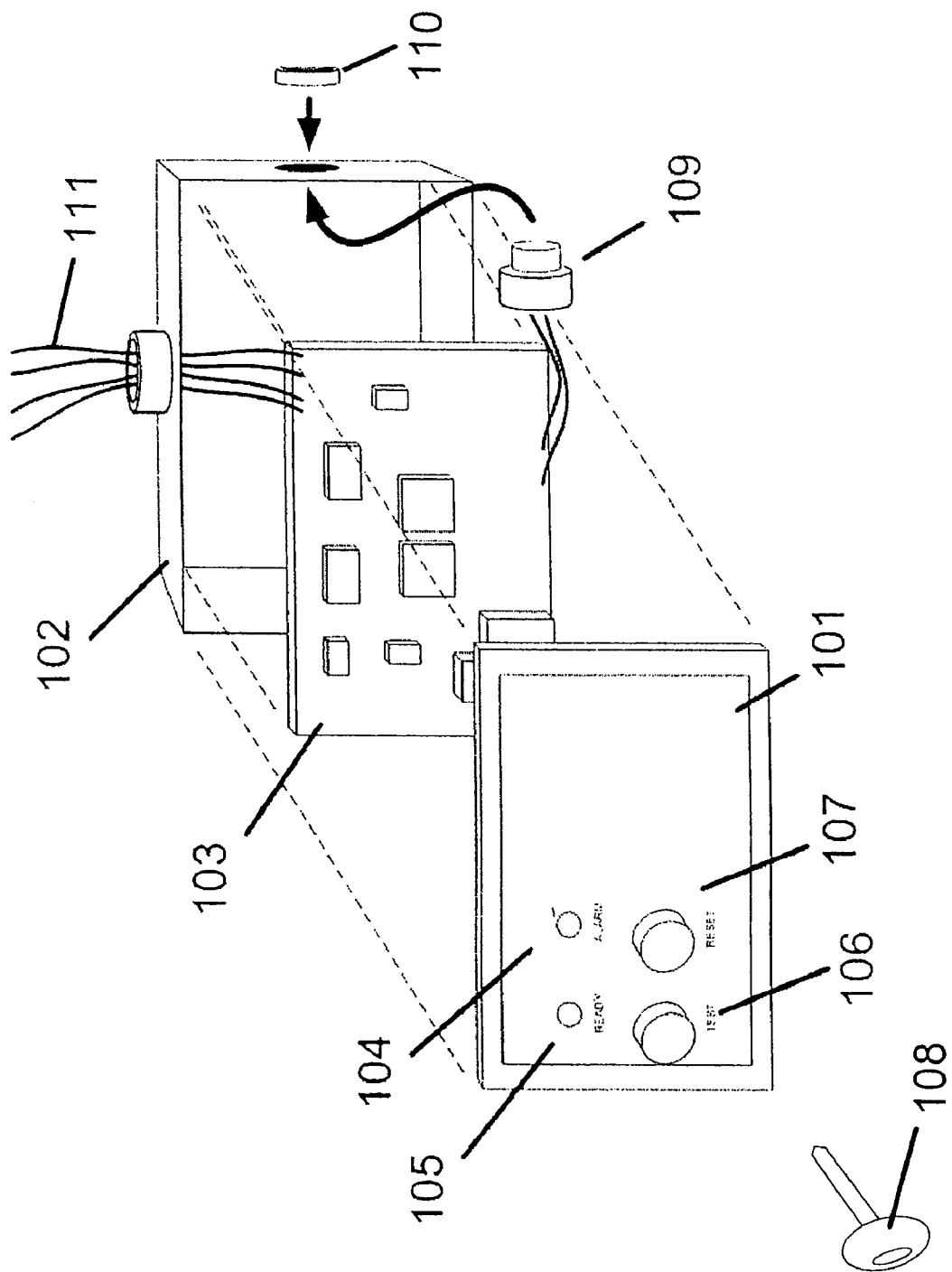
FIG. 1 is an exploded view of one preferred embodiment of a seismic switch.
Figure 2:
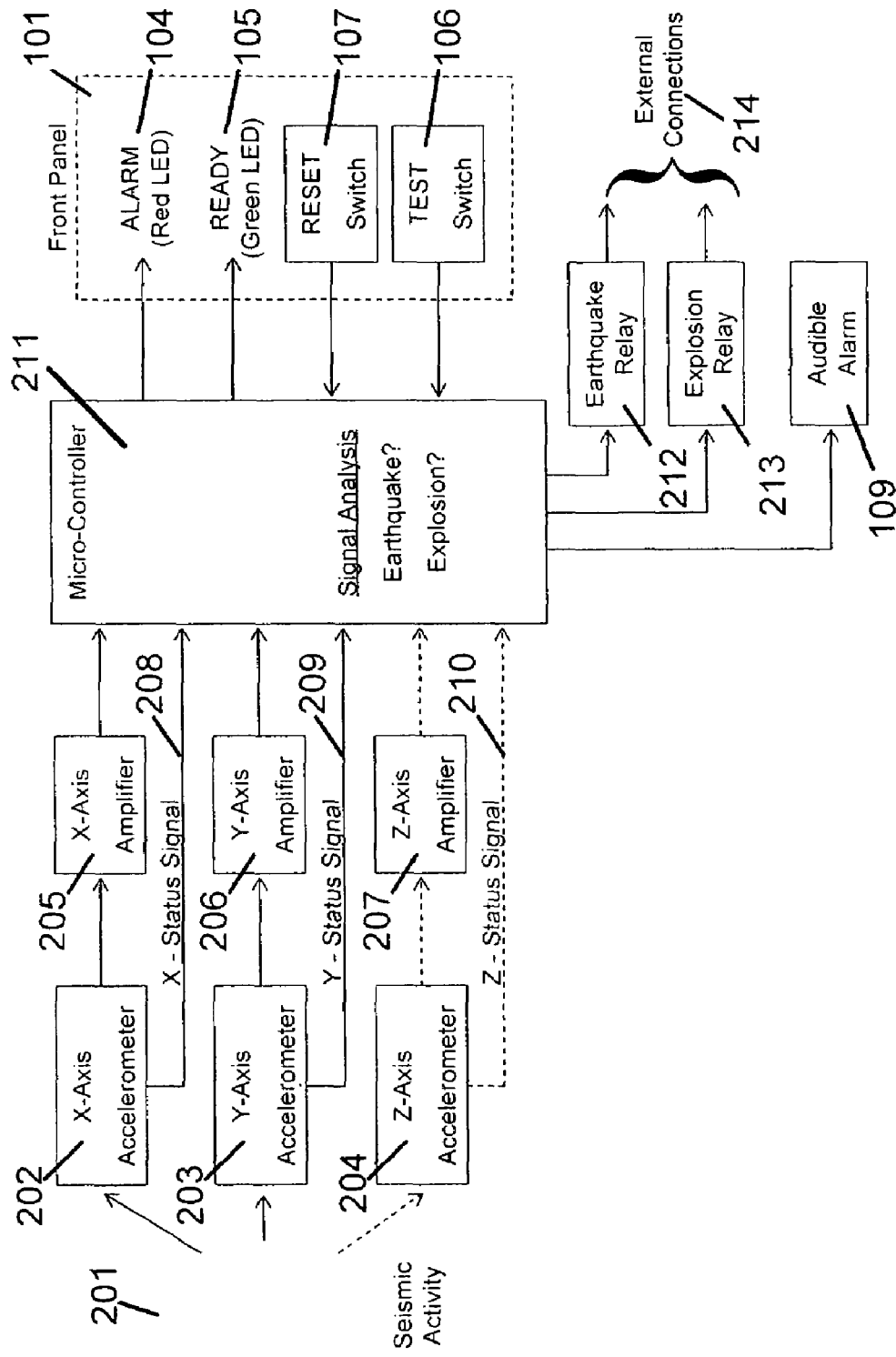
FIG. 2 is a functional block diagram of the seismic switch.
Figure 6:
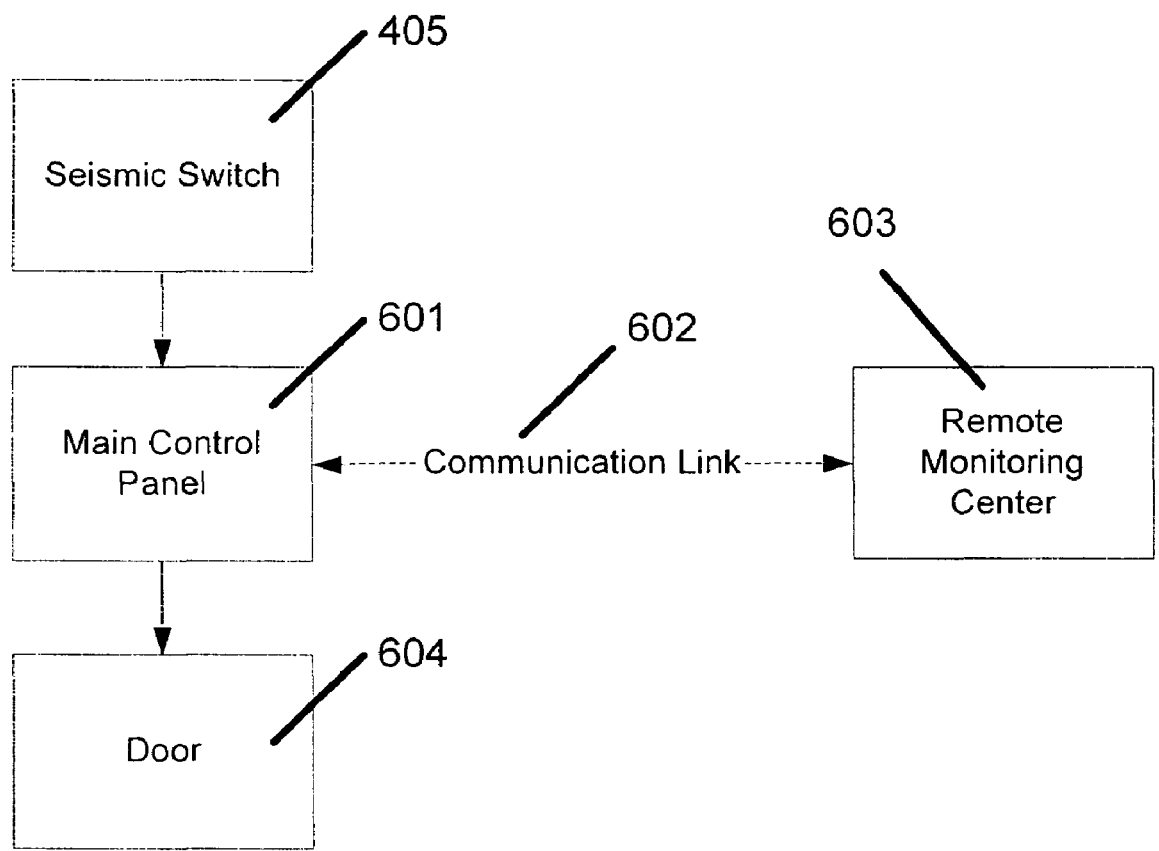
FIG. 6 is a functional block diagram of the seismic switch as it interacts with a typical security access control circuit.

Turning to FIG. 1, one preferred embodiment of a seismic control switch is described. Specifically, a seismic switch control circuit (103) is enclosed in a metal case (102) and has on the front panel (101) two push-button or keyed switches (106 and 107) and two indicator lights in the form of light emitting diodes or LEDs (104 and 105). The front panel (101) and the metal case (102) have mounting holes proximate their corners to permit mounting bolts to pass through for securing the seismic control switch in place. A red LED (104) is labeled "Alarm". This light's turning on means that the microcontroller analyzed the detected vibrations and concluded that the vibrations were due to either an earthquake or an explosion and that an ALARM condition exists. A green LED (105) is labeled "Ready". This LED indicates that the system has performed a self test and that all tested parts are working correctly. The switch labeled "Test" (106) is used to instruct the microcontroller to test the ALARM condition, the relays (212 and 213, which are shown in FIG. 2), the audible alarm or buzzer (109), and the external circuit to which the seismic switch is connected (601, 602, 603, and 604, which are shown in FIG. 6). The audible alarm (109) is mounted on a side wall of the metal case (102) and is held in place by an external nut (110). The "Reset" switch (107) forces the microcontroller to clear the ALARM condition and to return to the initial state, including performing the "Test" function described above. Wires (111) for power and other connections to the external security system pass through a hole in the top face of the metal case (102).

Turning to FIG. 2, one preferred embodiment of the detection and control circuit is further described. During normal operation the Ready LED (105) remains on. If a seismic signal (201) is detected by the accelerometers (202, 203, and 204), it is decomposed into X, Y, and Z components and converted to electronic signals. These are passed through amplifiers (205, 206, and 207) and are input into the microcontroller (211) for signal analysis. The analysis determines whether the incoming signals correspond to an earthquake, an explosion, or neither. If the signals are interpreted as being those resulting from an earthquake, the ALARM LED (104) is turned on, the Ready LED (105) is turned off, the earthquake relay (212) is activated, and the audible alarm (109) is turned on. If the signals correspond to an explosion, a similar sequence of events is triggered; the ALARM LED (104) is turned on, the Ready LED (105) is turned off, the explosion relay (213) is activated, the audible alarm (109) is turned on, and, in addition, an emergency communication system (603) is activated by the explosion relay (213) to inform emergency responders such as the fire department. The circuit can only be reset back to normal operation through the manual activation of the RESET switch (107) by authorized personnel. In one preferred embodiment, a keyed switch is used, so that resetting the device requires the right key (108). In another preferred embodiment, the reset is a pushbutton switch. So that only authorized persons can reset the device, the seismic switch is mounted within keyed box or otherwise restricted area.

The circuit for the two-dimensional seismic switch is composed of eight main components as shown in FIG. 2, namely two accelerometers (202 and 203), two amplifiers (205 and 206), a microcontroller (211), two relays (212 and 213), and a buzzer (109). Each accelerometer-amplifier pair corresponds to one of the Cartesian X and Y directions making up the horizontal plane, with a 90° angle between their axis. The extra components needed for the three-dimensional version of the seismic switch are also shown in FIG. 2 using dashed lines: an accelerometer (204) and an amplifier (207). These would be used to detect vibrations in the Z (or vertical) direction. The accelerometers convert changes in velocity (acceleration) into electronic voltage signals. These signals are then amplified to increase the instrument's sensitivity to seismic movement (201). The amplified signals are then fed into the microcontroller's analog-to-digital converters (ADCs), which automatically convert the signals to digitally encoded representations of the signals. The microcontroller (211) has subroutines to continuously monitor incoming signals and, in the event that it recognizes a signal's characteristics as those pertaining to an earthquake or an explosion, it activates the earthquake relay (212) or the explosion relay (213), respectively. At the same time, an audible signal is produced by the buzzer (109). The signal patterns of interest have been pre-programmed into the microcontroller (211) using tables that correlate each accelerometer's digitally encoded signal amplitudes, plus the signal's period, and thus its frequency. These tables are explained below, as part of the microcontroller's programming.

The microcontroller unit (211), or MCU, chosen to implement the seismic switch is a Motorola MC68HC908GP32 8-bit microcontroller. This microcontroller has 32 kB of FLASH memory, so that it can be programmed using C code to suit the application's needs. In addition, the MCU has two timers, eight channels of analog-to-digital converters, and a serial port, which allows for programming the unit after installation.

Figure 3:
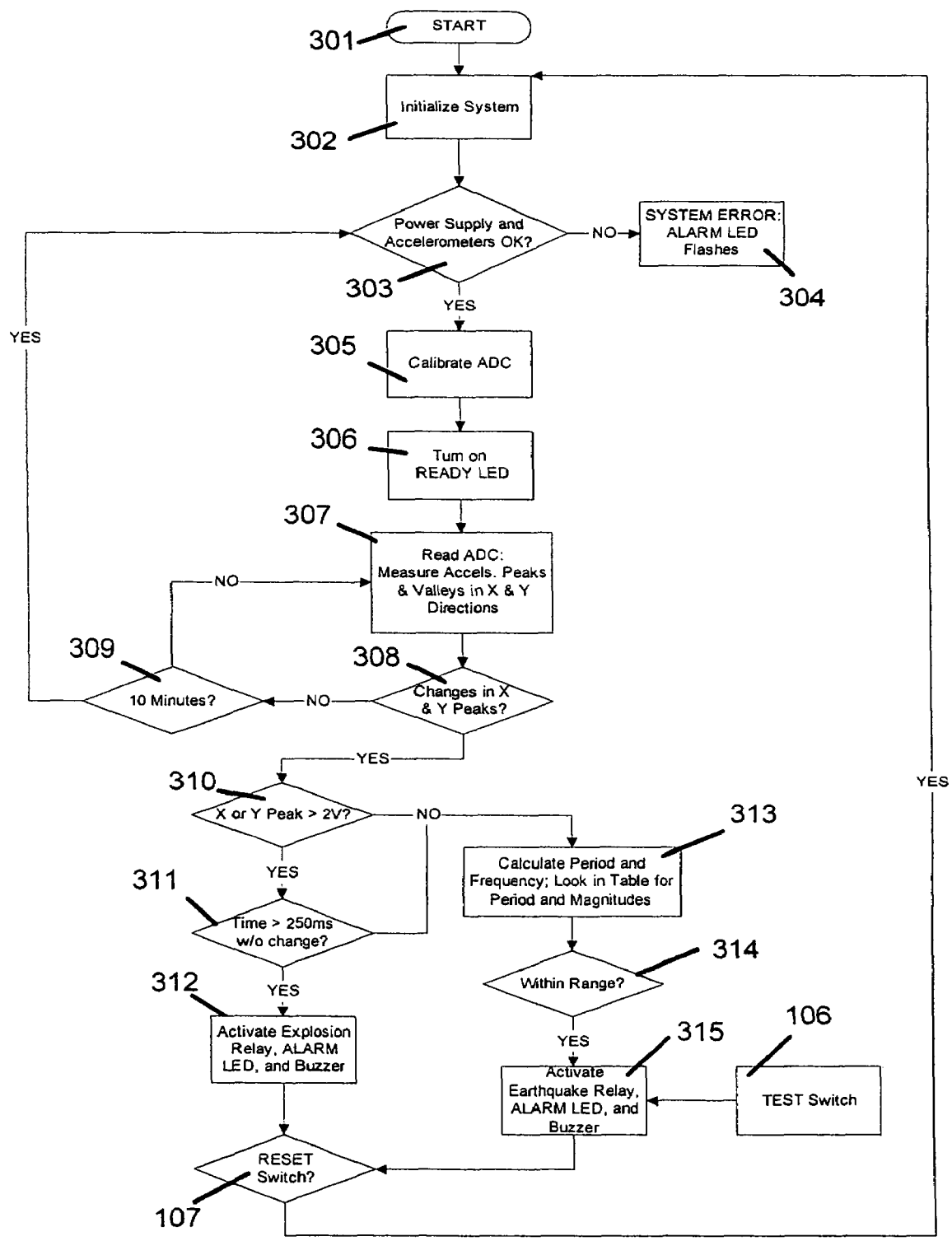
FIG. 3 is a flowchart of the control algorithm for the seismic switch.

Turning to FIG. 3, one preferred method of operating the seismic switch is described. When the unit is initially turned-on (301) or the RESET (107) switch is activated, the MCU initializes (302) the complete system, checks the power supplies and accelerometers (303), and then proceeds to take samples at the ADC inputs being used in order to calibrate the system (305). The accelerometers have status signals (208, 209, and 210) that are monitored by the MCU. If an error is detected during the initialization or testing stages (303), the MCU will make the red ALARM LED (104) continuously flash to indicate that a system error has occurred (304). Once the MCU has initialized, tested and calibrated the unit, it turns on the green Ready LED (105) to indicate that the system is working properly (306).

The MCU then goes into its regular mode of operation. It will read data (307) from the accelerometer-amplifier pairs to monitor changes in either the X or Y signals amplitudes. While sampling is performed, the peaks and valleys pertaining to each signal are averaged to reduce possible noise and false alarms. If ten minutes pass (309) and there are no significant and sustained changes in any of the peaks or valleys (308), the MCU will cycle through the testing and calibration sections and repeat the monitoring stage for another ten minutes. This pattern of sampling for ten minutes and testing will go on until changes occur in the peaks and valleys (308) or until the unit is set to the TEST mode via the TEST switch (106), to the RESET mode with the RESET switch (107), or if the unit is turned off by disconnection.

In order to detect the occurrence of an explosion, the occurrence of amplifier output saturation is monitored. If either X or Y amplifier (205 and 206) voltages exceed 2V (310) (corresponding to 0.33 g) for 250 milliseconds (311), the signal is interpreted as being due to an explosion and the actions pertaining to an explosion (312) are taken: namely, the ALARM LED (212) is turned on, the audible alarm is activated (109), and an emergency call is placed to a central monitoring center (603) and local authorities through a communication link (602). Since averaging of the input signals is being performed, noise effects and transients are filtered, thus minimizing the possibility of false triggering.

Figure 4:
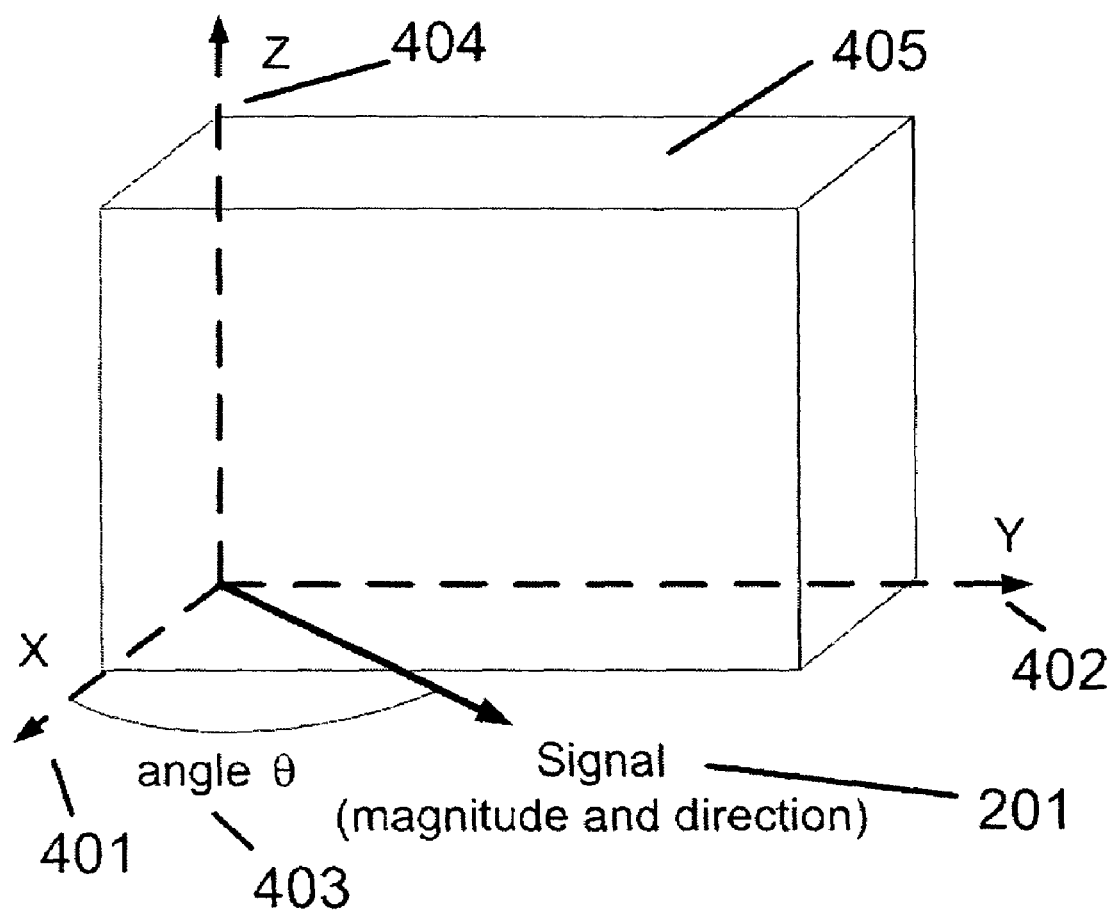
FIG. 4 is a perspective view of the seismic switch depicting the angle made from the signal to the seismic switch X-axis.

With reference to FIG. 4, the principle of operation behind one preferred earthquake signal analysis algorithm is now described. When a traveling signal (201) approaches a point in space, it possesses two important components, namely magnitude and direction, which together define the signal as a vector. If the magnitude and direction are known, the signal vector can be decomposed into X and Y components in the X (401) and Y (402) axis, respectively. By defining the angle (direction) between the X-axis (401) and the signal vector (201) as theta ($\theta$) (403), simple trigonometry allows for vector decomposition into X and Y components: the X component being the signal's amplitude times the cosine of $\theta$, and the Y component being the signal's amplitude times sine of $\theta$. At the same time, the acceleration forces (relative to Earth's gravitational acceleration, g) in an earthquake's signal represent the magnitude of the vector. Thus, the key element for the seismic switch (405) is to determine if the signal's amplitude, frequency, and duration is that from an earthquake. The amplitude requirement can be analyzed by setting an acceleration threshold value, so that if the signal's magnitude (acceleration) is greater than this threshold, it establishes the possibility that the signal might be that from an earthquake. To accomplish this, the threshold is decomposed into its X and Y components, converted to their respective digital equivalent representations and included in the code as a table. This allows for the MCU to compare these values to the digitized signals from the X and Y accelerometers. If both the X and Y components of the detected signal are larger than the corresponding threshold values (308), the signal could be that from an earthquake.

The signal's period and/or frequency are then needed to complete this two-part test. The program uses one of the MCU's internal timers to keep track of when peaks or valleys occur for each of the accelerometer-amplifier pairs (X and Y). The time difference between the occurrence of a peak and a valley corresponds to half a cycle, so by multiplying this time difference by two, the instantaneous signal period is obtained. A second table is used to correlate the period to the signal's intensity (313, which step is shown in FIG. 3). If the overall signal magnitude (combination of X and Y) is larger than the threshold for a particular time period, the signal is interpreted as being that from an earthquake (314). The microcontroller then proceeds to the earthquake ALARM condition (315). Here, the ALARM LED (104) and buzzer (109) are activated, along with earthquake relay (212). These remain activated until reset (107).

Figure 5:
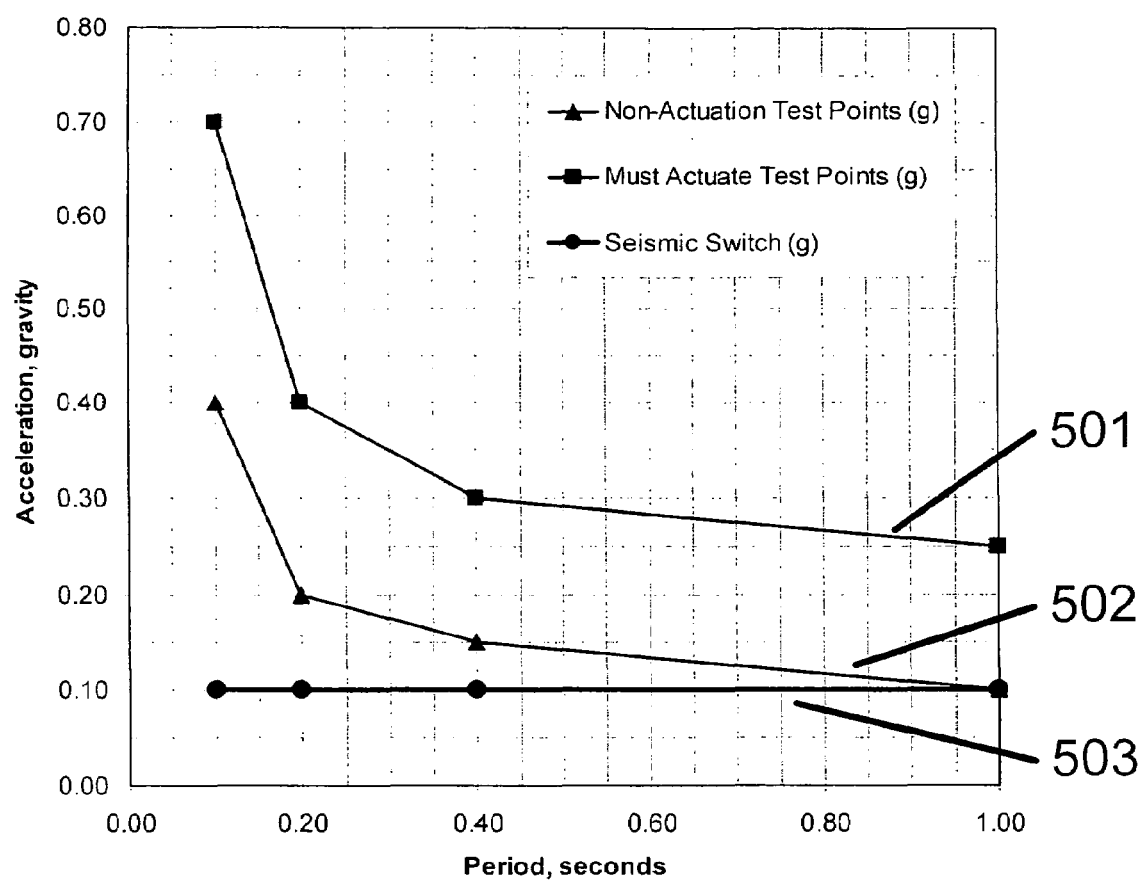
FIG. 5 is a graph showing the values required for earthquake-actuated automatic gas shutoff devices (ASCE 25-97) and the seismic switch.

Turning to FIG. 5, the operating parameters for automatic gas-valve shut-off devices as promulgated by ASCE standard 25-97 are shown along with the one preferred set of operating parameters for the seismic switch. Acceleration is plotted along the vertical axis and period is plotted along the horizontal axis. The must-actuate test points are shown along line 501. If a signal exceeds this line, under the ASCE standard 25-97, the gas-valve shut-off device must turn off. The non-actuation test points are shown along line 502. If a signal falls below this line, under the same standard, the gas-valve shut-off device may not turn off. The preferred threshold for the seismic switch is shown along line 503. Notably, it falls entirely below line 501, and only meets line 502 at the right-most data point.

This lower threshold is chosen to release doors even though only minor seismic activity has been detected. In applications such as a crowded commercial establishment, the seismic switch may be used to control the release of doors either directly or through a security system. When a minor earthquake occurs, it may not require that gas valves or similar such devices be turned off, but may still frighten people. In that event, if emergency doors were to remain locked and closed, people in a crowded commercial establishment may panic and rush for other exits. Such crowd panic can have seriously devastating results. To avoid this, emergency doors should be released even upon detection of minor seismic activity.

Accordingly, if a signal being measured has a magnitude larger than that specified for the actuation threshold for the signal's period, the valve must be shut-off. In order to make the seismic switch more sensitive to earthquakes, a threshold value of approximately 0.1 g, or more precisely and preferably 0.07 g, is used for all signal periods between 0 and 1 second as illustrated in FIG. 5. (This is equivalent to a VI on the Mercalli Scale.) In this manner, if a signal is being interpreted as that from an earthquake, the seismic switch activates (315) the corresponding relay (212) and the audible alarm (109).

Turning to FIG. 6 one preferred interaction between a seismic switch (405), a main control panel (601) to which the switch (405) is connected, a door (605) being controlled by the control panel (601), and a communication link (602) connecting to a remote monitoring center (603) is shown. In operation, the seismic switch (405) monitors for seismic signals. If any are detected, it determines whether it is an earthquake or an explosion. In the event of an earthquake, an earthquake signal (indicated by a closing relay) is sent to the main control panel (601); in the event of an explosion, an explosion signal (also indicated by a closing relay) is sent to the main control panel (601). The main control panel (601) includes other security functions. For example, it receives fire detection, intrusion, and any other security-related signals. In response to an earthquake signal, the main control panel (601) releases doors (604). In a preferred embodiment, the main control panel (601) does not call the remote monitoring center (603) because if all security systems were to place such a call during an earthquake all circuits would become busy. In alternative embodiments, it could, nonetheless, place such a call. In response to an explosion signal, the main control panel (601) releases doors (604) and calls the remote monitoring center (603), which notifies the emergency responders (e.g., fire department). The doors (604) can be standard doors such as those used in the patents described above along with the background of the invention. Alternatively, the doors (604) may be part of a security door system used in banks and other commercial establishments (also known as man-trap doors) and as described in U.S. Pat. No. 6,308,644, titled "Fail-Safe Access Control Chamber Security System," and U.S. Pat. No. 6,298,603, titled "Access Control Vestibule," both by the instant inventor and both of which are expressly incorporated herein by reference in their entirety.

Alternatively, the seismic switch can be used to control the release of one or more doors directly without a main control panel.

When the seismic switch is used along with delayed-egress fire doors, detection of a seismic event overrides the delay so that the doors release immediately.

Physically, the main control panel typically is constructed of a metal box having a keyed access door. The seismic switch as shown and described is approximately the size of a standard 12 volt, 4 amp, d.c. battery so that it can fit inside the box containing the main control panel. More particularly, the dimensions of seismic switch do not exceed five inches in either height, width or depth. More preferably, the seismic switch is approximately three and a half inches high, four and a half inches wide, and two and a half inches deep. Although the seismic switch can be smaller or larger, this approximate size is preferred because a smaller size can be difficult to firmly mount on a vibration table for testing.

Figure 7A:
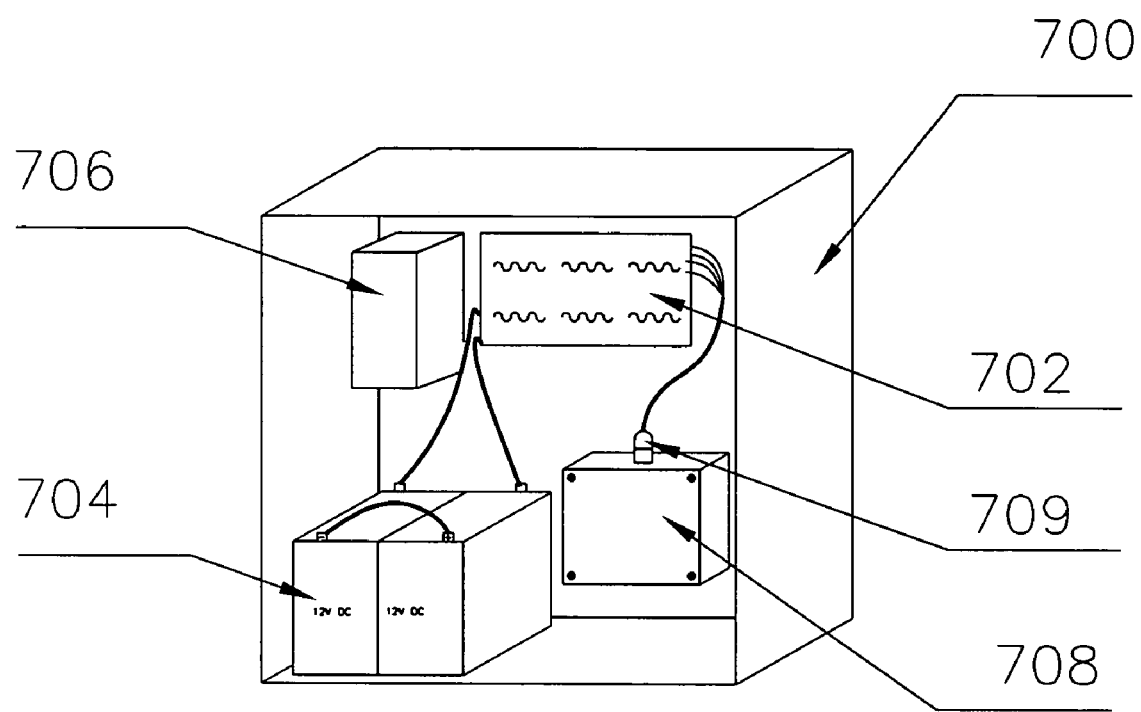
FIG. 7A is a perspective view of a control panel (either fire or door), including a seismic detection system.

Turning to FIG. 7A, a seismic switch (708) is shown as part of a control panel (700). The control panel (700) can be either a fire control panel or a door control panel. The control panel (700) includes an external housing in which the various components are mounted. These include circuit board (702) which includes a controller for the panel's functionality, standard batteries (704) and power supply (706). As shown, seismic switch (708) is approximately the same size as the standard batteries (704) and fits in the space which is ordinarily provided in the control panel for them. The seismic switch is mounted to the back of the control panel by the mounting plate (shown in FIGS. 7c and 7d). Wires run from the seismic switch (708) to the circuit board (702) through a connector 709 (preferably a Cannon plug) to provide power to the seismic switch and to provide the seismic signal (or switch) to the controller on the circuit boar (702).

In an alternative configuration, the seismic switch (708) is mounted outside the control panel (700) and the connecting wires run through a hole in the side of the control panel's enclosure. In this configuration of the seismic switch (708) the connecting cable is armored to prevent cutting or shorting of the cable wires. In addition, this configuration requires a keyed reset switch (which is not necessary if the seismic switch (708) is contained within a keyed control panel).

Similar to a smoke sensor, the seismic sensor should be periodically tested. The frequency of such testing will depend upon fire code and standards. Absent a code or standards establishing otherwise, the testing should be conducted on the order of every six (6) months.

Figure 7B:
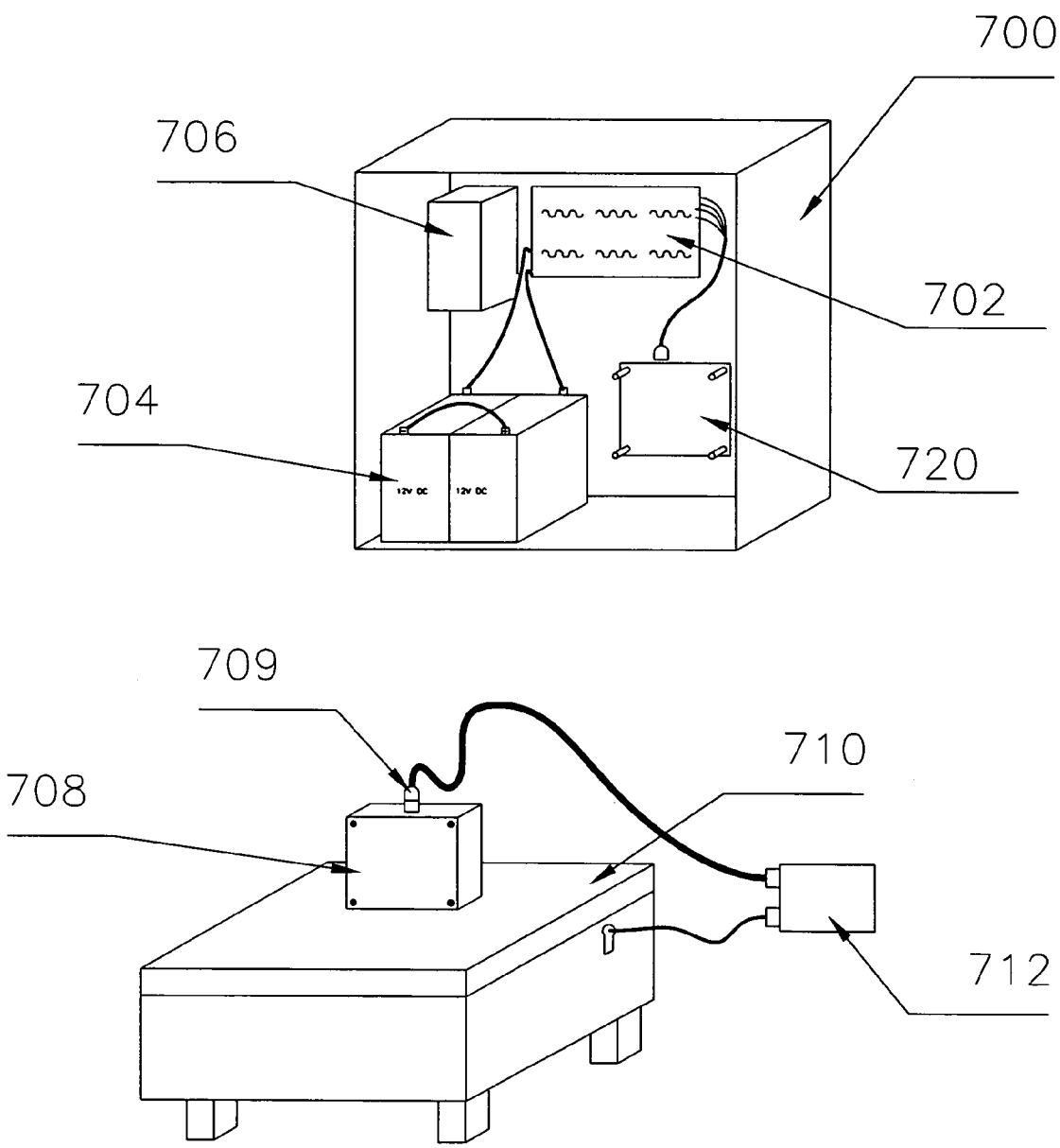
FIG. 7B is a perspective view of the control panel of FIG. 7A, where the seismic detection system has been removed and placed upon a vibration table for testing.

To test the seismic sensor, it is dismounted from inside the control panel (700), disconnected by connector 709 and placed on a vibration table. This is shown in FIG. 7B. A programmed controller (712) operates the vibration table (710). With reference to the actuation points shown in FIG. 5, the seismic sensor (708) is checked at a number of different points to ensure proper operation. First the vibration table (708) is set at a low amplitude and a long period (e.g., 0.05 g with 1.0 second period). This should cause the detection of an earthquake. The seismic sensor is then reset and a new vibration applied which should not active any alarm condition (e.g. 0.20 g with a 0.1 second period). Preferably, test points at 1, 2.5, 5 and 10 Hz are made. Additional points may be used to further ensure proper operation.

The proper operation of the seismic switch (708) can be determined from either the front panel lights provided on the seismic switch or from the signals provided to the circuit board (702) or from the programmed controller. If the lights on the front panel are used, then a separate light is provided on the front panel for each type of alarm condition. If the seismic switch (708) passes these tests, it is operating properly and is re-mounted in the control panel (700) as shown in FIG. 7A.

In another preferred test configuration, the seismic switch (708) is removed from the control panel 708 and an extension cord is used to extend the length of the connection between the control circuit (702) and the seismic switch (708). This permits the testing of the operation of the control panel circuitry along with the seismic switch (708). This configuration may be used to comply with any applicable codes or standards.

Figure 7C:
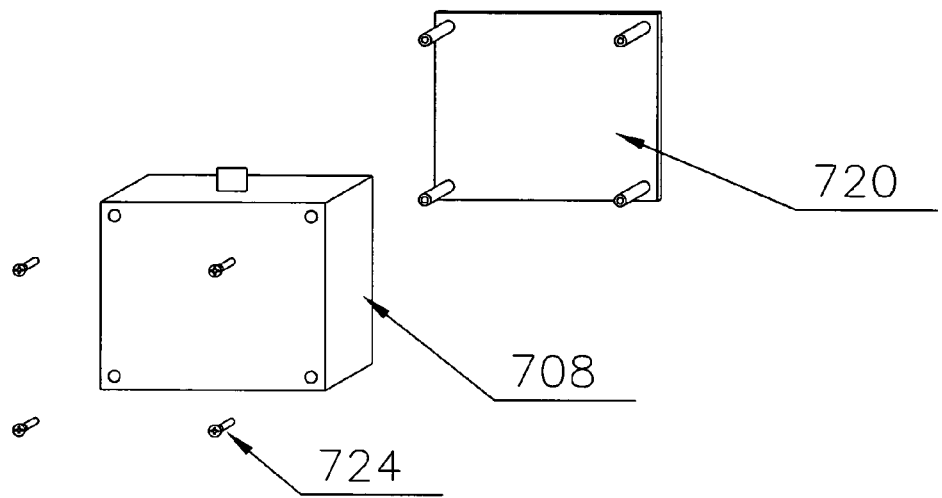
FIG. 7C is an exploded view of the seismic detection system of FIG. 7A from a front perspective.
Figure 7D:
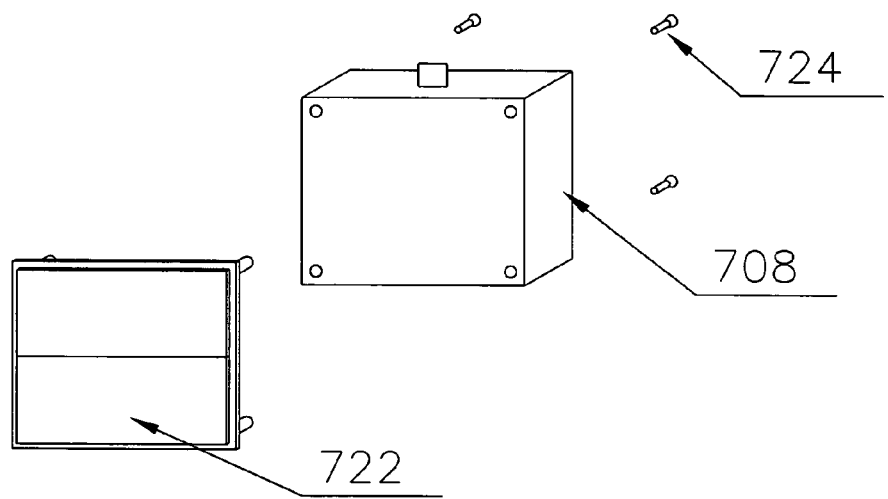
FIG. 7D is an exploded view of the seismic detection system of FIG. 7A from a back perspective.

Turning to FIGS. 7C and 7D, one preferred method of mounting the seismic switch (708) is further described. A mounting plate (720) is provided. On the back face of the mounting plate (720), structural tape bonds it to the control panel enclosure (shown in FIG. 7B). A stand-up (722) is provided on each corner of the mounting plate (720). Screws (724) pass through the corners of the seismic switch (708) to engage the stand-ups (722).

As those skilled in the art will appreciate, many variations and modifications can be made to the preferred embodiments described above without departing from the spirit of the invention. All such variations and modifications are intended to be encompassed within the scope of the following claims.

I claim:

1. A method of operating a seismic sensor comprising the steps of:
   (a) providing a seismic sensor, wherein the seismic sensor includes:
      (1) a set of accelerometers that generate electronic signals in response to vibrations caused by an earthquake;
      (2) a controller operationally coupled with the set of accelerometers and configured to receive the electronic signals and to determine whether the electronic signals represent an earthquake;
      (3) a switch having a first and a second state, operationally coupled with the controller, wherein the controller changes the state of the switch upon detection of an earthquake; and
      (4) a first enclosure for housing the set of accelerometers, the controller and the switch;
   (b) connecting the seismic sensor to a control system, wherein the control system includes:
      (1) a controller which is operationally coupled with the switch;
      (2) a second enclosure, larger than the first enclosure, for housing the controller;
   (c) fixedly mounting the seismic sensor adjacent to or inside of the control system;
   (d) periodically dismounting the seismic sensor and placing the seismic sensor on a vibration table, wherein the vibration table is operated to simulate the condition of an earthquake so that the seismic sensor operates to change the state of the switch; and
   (e) re-mounting the seismic sensor when the seismic sensor operates to change the state of the switch in response to the simulated condition of the earthquake.

2. The method of claim 1, wherein the set of accelerometers further generate electronic signals in response to movement caused by an explosion.

3. The method of claim 1, wherein in the step of providing the seismic sensor, the accelerometers comprise a first accelerometer configured to detect vibrations along a first axis and a second accelerometer configured to detect vibrations along a second axis, orthogonal to the first axis.

4. The method of claim 3, wherein the step of providing the seismic sensor, the accelerometers further comprise a third accelerometer configured to detect vibrations along a third axis, orthogonal to the second and third axis.

5. The method of claim 1, wherein in the step of providing the seismic sensor, the controller comprises analog-to-digital converters and wherein the electric signals generated by the set of accelerometers are received by the analog-to-digital converters.

6. The method of claim 1, wherein in the step of providing the seismic sensor, the switch comprises a relay.

7. The method of claim 1, wherein in the step of providing the seismic sensor, wherein the switch comprises an electronic switch.

8. The method of claim 1, wherein in the step of providing the seismic sensor, the seismic sensor further includes an earthquake indicator operationally coupled with the controller and configured to indicate detection of an earthquake, an explosion indicator operationally coupled with the controller and configured to indicate detection of an explosion, and a reset switch to reset either of the earthquake or explosion alarm conditions.

9. The method of claim 1, wherein in the step of providing the seismic sensor, the enclosure is less than approximately five inches in height, width and depth.

10. The method of claim 9, wherein in the step of providing the seismic sensor, the enclosure is explosion-proof and water-tight housing having a front face, wherein the set of accelerometers, the set of amplifiers, the controller, and the switch are mounted within the explosion-proof and water-tight housing.

11. The method of claim 1, wherein in the step of providing the seismic sensor, the enclosure is approximately four and a half inches in height, three and a half inches in width and two and a half inches in depth.

12. A method of operating a seismic sensor comprising the steps of:
   (a) providing a seismic sensor configured to detect an earthquake, wherein the seismic sensor comprises:
      (1) a set of accelerometers that generate electronic signals in response to vibrations caused by an earthquake;
      (2) a controller operationally coupled with the set of accelerometers and configured to receive the electronic signals and to determine whether the electronic signals represent an earthquake;
      (3) a switch having a first and a second state, operationally coupled with the controller, wherein the controller chances the state of the switch upon detection of an earthquake; and
      (4) a first enclosure for housing the set of accelerometers, the controller and the switch,
   (b) fixedly mounting the seismic sensor;
   (c) periodically dismounting the seismic sensor and placing the seismic sensor on a vibration table, wherein the vibration table is operated to simulate the condition of an earthquake;
   (d) re-mounting the seismic sensor when the seismic sensor operates to detect an earthquake in response to the simulated condition of the earthquake; and
   (e) connecting the seismic sensor to a control system, wherein the control system includes:
      (1) controller which is operationally coupled with the switch; and
      (2) a second enclosure, larger than the first enclosure, for housing the controller.

13. The method of claim 12, wherein the step of fixedly mounting the seismic sensor comprises mounting the seismic sensor inside of the second enclosure of the control system.

14. The method of claim 12, wherein the step of fixedly mounting the seismic sensor comprises mounting the seismic sensor adjacent to the second enclosure of the control system.

* * * * *